May 12, 1942.　　C. T. BREMILLER　　2,283,039
REEL CONTROL
Filed April 29, 1940
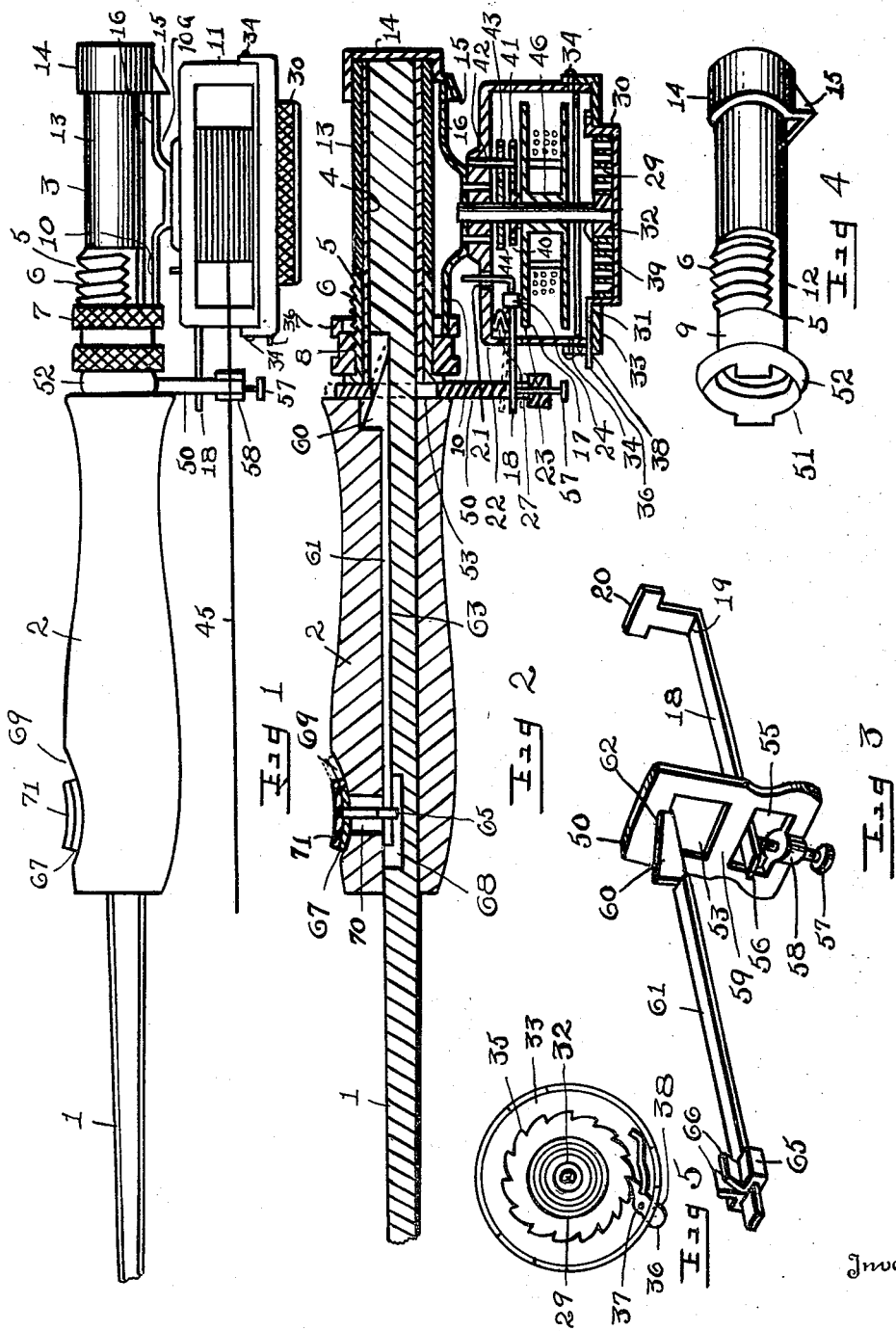
Inventor
Charles Thomas Bremiller
By Thomas L. Wilder
Attorney

UNITED STATES PATENT OFFICE 2,283,039

REEL CONTROL

Charles Thomas Bremiller, Utica, N. Y.

Application April 29, 1940, Serial No. 332,153

2 Claims. (Cl. 242—84.5)

My invention relates to a reel control and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a device for controlling the actuation of the reel when it is desired to pull in the fishing line. The control is disposed on the grip of the fishing rod, whereby the fisherman can hold the pole in one hand and actuate the reel with the thumb of the same hand thereby leaving his other hand free to work the line if desired. The attachment can be fitted to any automatic reel.

The object will be understood by referring to the drawing in which,

Fig. 1 is an elevational view of the fishing rod with the reel control attached, parts being broken away.

Fig. 2 is a central vertical section of Fig. 1, parts being shown in full.

Fig. 3 is a detail view showing a perspective of the reel control mechanism shown apart from its connection with the fishing line.

Fig. 4 is a detail enlarged view showing a perspective of a sleeve employed.

Fig. 5 is a detail view drawn to somewhat smaller scale showing a plane view of a portion of the reel employed.

Referring more particularly to the drawing bamboo part of a fishing rod is shown at 1 to which is attached in the usual manner cork grip 2. There extends from the rear part of cork grip 2 the reel holder 3 having a wooden sleeve 4, a metal member 5 provided with external threads 6 and a ring locking member 7 mounted to travel thereon. To this end it has internal threads 8 for a portion of its width. It also has a smooth portion at 9 for the insertion of one end 10 of the bracket 10a that aids in supporting reel 11. For this purpose the threads 6 are cut away on the upper side at 12 of metal member 5. A composition sleeve 13 fits over the wooden sleeve 4. A closed cap 14 is fitted to the extreme end of composition sleeve 13. It has a depending shelf 15 for engaging the opposite end 16 of bracket 10a.

Reel 11 has an automatic wind up line spool 17 of the conventional type. Brake arm 18 is disposed adjacent and just above line spool 17. It is adapted when elevated to allow the automatic winding spool 17 to rotate, whereby to wind up the fishing line thereon and when dropped down into full line position shown in Fig. 1 it automatically stops the rotation of the winding spool.

Brake arm 18 has its inner end bent at right angles at 19. The vertical extended part 20 forms a T which projects upward through a suitable orifice 21 made in casing 22 of reel 11, whereby to hold said brake arm 18 in position contiguous to the upper surface of disc 23 of spool 17. A leather brake band 24 is wound around arm 18 and contacts with the upper surface of said disc 23 of line spool 17.

A spring 27 fastened to the underside of the upper surface of casing 22 is doubled back upon itself. Its free end rests on the upper surface of brake arm 18 to hold said brake band 24 on arm 18 normally against the upper side of the upper surface of disc 23, whereby to hold spool 17 from turning under the influence of spring 29.

Spool 17 is of the conventional kind. It is rotated in one direction by spring 29 which in fastened at one end to the casing of cup shaped member 30 and at the other to central hub 32 mounted to turn within cup shaped member 30. A flange 31 is formed on the upper rim of cup shaped member 30. Said flange 31 rests on the contiguous surface of the lower part 33 of casing 22 which is held to the upper part by screw bolts 34, 34, 34. Ratchet teeth 35 are formed on the peripheral edge of flange 31. Said teeth are engaged by a spring pressed pawl 36, which is pivoted at 37 to the lower part 33 of casing 22, whereby to prevent said spool 17 from turning in one direction or in a direction which would permit spring 29 to unwind. Said pawl 36 projects beyond casing 22 through a suitable aperture 38 therein, whereby it can be rocked by the operator's finger to release cup shaped member 30 and thereby allow it to turn under tension of spring 29, if desired, to run down condition.

The means for winding up said spring 29 embodies the cup shaped member 30 having hub 32 mounted to turn therein as stated above. It has a central annular aperture flat on one side, whereby to engage the flat portion of central shaft 39, whereby said shaft 35 will turn with hub 32. Spool 17 has a central hub member 46 mounted on shaft 39. A pinion 40 is mounted on disc 23 and turns with spool 17. Pinion 40 engages a spur gear 41 mounted to turn on a pivot 42 carried in a tight bearing in casing 22. Another pinion 43 is mounted above on spur gear 41 and turns therewith. Said pinion 43 engages another spur gear 44 mounted to turn with shaft 39, whereby the turning of said shaft 39 by spring 29 will rotate spool 17 through the train of gears above mentioned, namely, gear 44, pinion 43, spur gear 41, and pinion 40 to wind line 45 thereon as is well known in the art and herein set forth to explain the control mechanism of the brake arm 18.

The means for controlling the release of brake arm 18 to allow spool 17 to rotate, whereby to wind in said fishing line 45 embodies a hanger 50 which fits into a loose guide way 51 formed by cutting away or back into bead 52 of metal member 5. Furthermore, a recess 53 is made in hanger 50 to allow for the projection of bamboo 1 of the fishing rod.

The lower portion of hanger 50 is recessed also at 55 for the projection of the extended part 56 of brake arm 18. A set screw 57 is mounted to a threaded aperture in the enlarged part 58 of hanger 50, whereby to allow for adjustability and to hold the arm 18 rigidly against the central part 59 of hanger 50.

The means for actuating hanger 50 upward in a vertical plane embodies a cam 60 formed integral and at right angles to its shank 61. Cam 60 engages hanger 50 adjacent the open rectangular shaped recess 62 formed in the upper portion of said hanger 50.

Shank 61 extends forward of the fishing rod and is disposed in a countersunk recess 63 made in the upper surface of bamboo 1 surrounded by cork grip 2. A clip 65 is wound around and fastened to the forward end of shank 61. The free ends 66, 66 of clip 65 extends upward through grip 2 and through an aperture in thumb plate 67. Moreover, countersunk recess 63 is deepened at 68, whereby to clear the lower part of clip 65.

The free ends 66 are bent down on the upper surface of plate 67 hereinafter mentioned, whereby to cause shank 61 and its cam 60 to move with the motion of said plate 67. Thumb plate 67 is formed on the arc of a circle and has a sliding fit in a correspondingly curved recess 69 made in the top of cork grip 2. A recess 70 is made in grip 2 beneath thumb plate 67 sufficiently long, whereby to allow for the longitudinal movement of clip 65. Moreover, a rubber pad 71 is cemented or otherwise secured to the upper surface of plate 67 to increase the friction or grip of the thumb thereon, when moving said plate 67.

The operation of the reel control is easily effected by the fisherman with the thumb of the hand that is grasping the grip 2. Assuming the fisherman has caught a fish and wishes to wind the fishing line 45 in on reel 11. He will press down and to the rear or right shown in Figs. 1 and 2, whereby shank 61 and its cam 60 will be moved to the right in said Figs. 1 and 2 or dotted line position shown in Fig. 2. Cam 60 will engage hanger 50 at recess 62 and sliding thereunder will elevate hanger 50 in a vertical plane. Inasmuch as the lower part of hanger 50 is in engagement with brake arm 18, said brake arm 18 will be elevated, whereby the leather brake band 24 will be elevated off of arm 18 to release spool 17 which will rotate under the influence of spring 29 and thereby draw in the fishing line 45. Immediately the fisherman desires to stop reeling in line 45, he will move his thumb forward or to the left shown in Figs. 1 and 2 or into full line position shown in Fig. 2, whereupon cam 60 will be moved to lower position from under hanger 50 and thereby allow brake arm 18 under the influence of spring 27 to draw hanger 50 downward to normal position. In this latter position leather brake band 24 will contact again the upper surface of disc 23 and thereby stop the rotation of line spool 17.

Having thus described my invention what I claim as new and desire to secure by Letters Patent is as follows:

1. In a reel control having a brake arm, a member having a recess for the projection of said brake arm, a screw mounted in said member for holding said brake arm in adjustable relation with said first named member, a cam member for engaging said first named member, a shank mounted to said cam member, a finger plate secured to said shank, whereby the movement of said finger plate will actuate said first named member to release the brake member.

2. In a reel control having a brake arm, a vertically movable member for engaging said brake arm, a recess formed in said vertically movable member for the projection of said brake arm, a set screw mounted in said vertically movable member for holding said vertically movable member in adjustable relation to said brake arm, a second recess formed in said first named member for the projection of a cam member, a shank mounted to said cam member, a finger plate secured to said shank, whereby the movement of said finger plate will actuate said first named member to release the brake member.

CHARLES THOMAS BREMILLER.